US 12,505,383 B2

United States Patent
Geada et al.

(10) Patent No.: US 12,505,383 B2
(45) Date of Patent: Dec. 23, 2025

(54) CONFIGURING AN EXPLANATORY MODEL TO OUTPUT CONSISTENT EXPLANATIONS ACROSS INPUTS

(71) Applicant: RED HAT, INC., Raleigh, NC (US)

(72) Inventors: Robert Joao Geada, Newcastle upon Tyne (GB); Rui Miguel Cardoso De Freitas Machado Vieira, Newcastle upon Tyne (GB)

(73) Assignee: Red Hat, Inc., Raleigh, NC (US)

( * ) Notice: Subject to any disclaimer, the term of this patent is extended or adjusted under 35 U.S.C. 154(b) by 570 days.

(21) Appl. No.: 18/080,290

(22) Filed: Dec. 13, 2022

(65) Prior Publication Data
US 2024/0193472 A1  Jun. 13, 2024

(51) Int. Cl.
*G06N 20/00* (2019.01)

(52) U.S. Cl.
CPC ................... *G06N 20/00* (2019.01)

(58) Field of Classification Search
None
See application file for complete search history.

(56) References Cited

U.S. PATENT DOCUMENTS

| | | | | |
|---|---|---|---|---|
| 11,429,878 | B2 * | 8/2022 | Saillet ................ | G06N 5/00 |
| 11,544,136 | B1 * | 1/2023 | Pekel ................. | G06N 20/00 |
| 11,568,281 | B2 * | 1/2023 | Isahagian ........... | G06N 20/00 |
| 11,875,409 | B1 * | 1/2024 | Narayan ............. | G06Q 10/10 |
| 2018/0137415 | A1 * | 5/2018 | Steinberg ........... | G06N 7/01 |
| 2018/0322406 | A1 * | 11/2018 | Merrill .............. | G06N 20/20 |
| 2019/0378210 | A1 | 12/2019 | Merrill et al. | |
| 2020/0167677 | A1 * | 5/2020 | Verma .............. | G06N 3/042 |
| 2021/0158227 | A1 * | 5/2021 | Budzik ............. | G06N 5/01 |
| 2021/0365189 | A1 * | 11/2021 | Masuda ............ | G06F 3/0635 |
| 2022/0114481 | A1 * | 4/2022 | Yang ................ | G06N 3/045 |

OTHER PUBLICATIONS

Kushnir, Liubomyr, "Benchmarking Of Post-Hoc Local Interpretability Methods For Classifying Malicious Traffic", Tallinn Univ. of Technology, School of Information Technologies, Dept. of Software Science, Master's Thesis, 2020; pp. 1-78.

Lundberg et al., "Explainable AI for Trees: From Local Explanations to Global Understanding", Paul G. Allen School of Computer Science and Engineering, Univ. of Washington, Nov. 15, 2022; pp. 1-82.

* cited by examiner

*Primary Examiner* — Maikhanh Nguyen
(74) *Attorney, Agent, or Firm* — Kilpatrick Townsend & Stockton LLP

(57) ABSTRACT

In some examples, a system can receive input datasets that each include a respective set of variable values for the same set of variables, where the input datasets have different values for a particular variable in the set of variables. The system can generate encoded input datasets by encoding the different values of the particular variable. The system can also generate encoded background data. The system can then generate synthetic data based on the encoded input datasets and the encoded background data. The system can provide the synthetic data as input to a target model to receive outputs from the target model. The system can then configure an explanatory model based on the synthetic data and the outputs from the target model. The explanatory model can generate scores indicating how a selected set of values for the set of variables influences an output from the target model.

17 Claims, 7 Drawing Sheets

|  | Variable 1 | Variable 2 | Variable 3 | Variable 4 | Variable 5 |
|---|---|---|---|---|---|
| First Input Dataset 104a | Ant | Box | Car | Dog | Fox |
| Second Input Dataset 104b | Ant | Zip | Car | Dog | Van |
| Third Input Dataset 104c | Ant | Cup | Car | Dog | Van |

FIG. 2

| | Variable 1 | Variable 2A | Variable 2B | Variable 2C | Variable 3 | Variable 4 | Variable 5A | Variable 5B |
|---|---|---|---|---|---|---|---|---|
| First Encoded Dataset 106a | Ant | Box | Null | Null | Car | Dog | Fox | Null |
| Second Encoded Dataset 106b | Ant | Null | Zip | Null | Car | Dog | Null | Van |
| Third Encoded Dataset 106c | Ant | Null | Null | Cup | Car | Dog | Null | Van |

… # CONFIGURING AN EXPLANATORY MODEL TO OUTPUT CONSISTENT EXPLANATIONS ACROSS INPUTS

TECHNICAL FIELD

The present disclosure relates generally to explanatory models usable to explain the functionality of machine-learning models. More specifically, but not by way of limitation, this disclosure relates to configuring an explanatory model associated with a machine-learning model to output consistent explanations in response to different inputs.

BACKGROUND

The field of explainable artificial intelligence (XAI) seeks to investigate the intuition of black-box models, which are prediction systems whose inner workings are either inaccessible or so complex as to be conventionally uninterpretable. Some common examples of such black-box models include deep neural networks and random forests. Explanations of these models may be necessary for regulatory reasons. For example, the General Data Protection Regulation (GDPR) entitles subjects of automated decisions the right to ask for an explanation of the decision-making process that led to those decisions. Furthermore, the behavior of these models must be investigated to ensure that they are compliant with regulations and business ethics, for example, to guarantee that they do not base their decisions on protected attributes such as race or gender.

BRIEF DESCRIPTION OF THE DRAWINGS

FIG. 2 shows an example of input datasets according to some aspects of the present disclosure.

FIG. 3 shows an example of one-hot encodings of the input datasets according to some aspects of the present disclosure.

DETAILED DESCRIPTION

Figure 1:
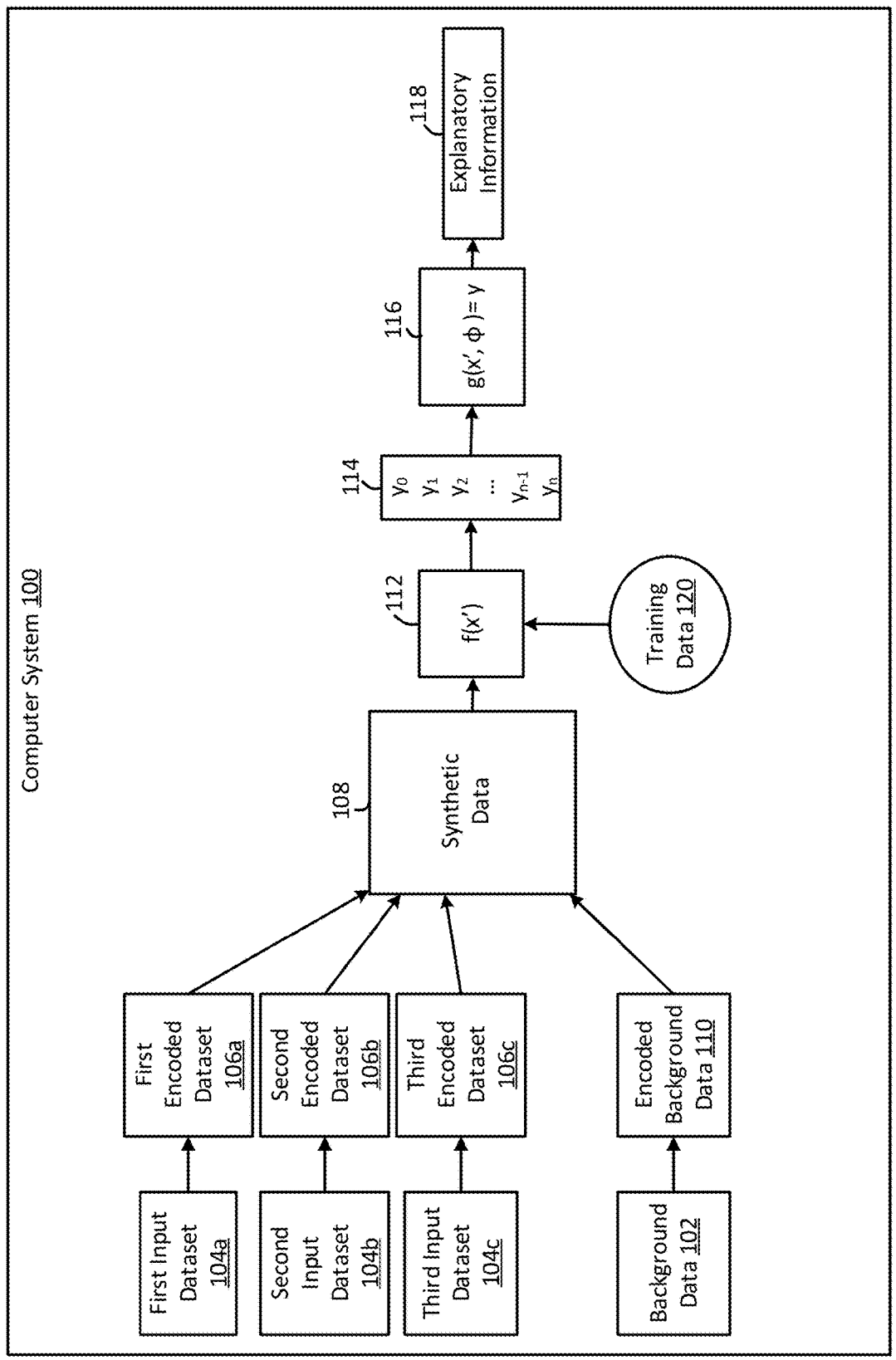
FIG. 1 shows an example of a process for configuring an explanatory model to output consistent results according to some aspects of the present disclosure.

Multiple kinds of explanatory models can be used to help explain a black-box model, such as a neural network. Some examples of such explanatory models can include a Shapley Additive explanations (SHAP) model or LIME model. The explanatory models may provide a quantitative indication of how much each variable value in the input contributed to an output from a black-box model. For example, an explanatory model may assign a numerical weight to each input variable value indicating its influence on the overall output from the black-box model to help a user better understand in the inner workings of the black-box model. But there are many situations where these types of explanatory models output inconsistent results. For example, an explanatory model may output different results when provided with two inputs that only differ by one variable value.

As one specific example of the abovementioned problem, two individuals may request to access a service by a service provider. The service provider may accept or deny their requests based on certain information provided by the individuals. For example, the individuals may supply their credit scores (cs), debt-to-income (d2i) ratios, and their ages, among other details. In particular, the first individual may provide the following details: [cs=650, d2i=0.5, age=29]. The second individual may provide the following details: [cs=650, d2i=0.5, age=31]. These details can be input to an explanatory model, which may output the following explanation for the first individual: [cs=+15%, d2i=−25%, age=+17%]. The explanatory model may also output the following explanation for the second individual: [cs=−5, d2i=+15%, age=+27%]. These outputs can help explain how the values of the input variables influence the likelihood of the service provider accepting each individual's request. Despite the only difference in the two sets of inputs being the age, the outputs from the explanatory model are considerably different. The first output for the first individual suggests that the credit score of 650 increased the likelihood of acceptance by 15%, while the second output for the second individual suggests that the exact same score of 650 decreased the likelihood of acceptance by 5%. The first output for the first individual also suggests that the d2i of 0.5 decreased the likelihood of acceptance by 25%, while the second output for the second individual suggests that the exact same d2i of 0.5 increased the likelihood of acceptance by 15%. These types of inconsistent outputs from the explanatory model are unintuitive, confusing, and unhelpful in presenting a clear picture of the model's behavior. Furthermore, these types of inconsistent results can make explanations seem arbitrary to non-technical users, making the model seem untrustworthy.

Some examples of the present disclosure can overcome one or more of the abovementioned problems by configuring an explanatory model associated with a black-box model to output consistent explanations, for example by guaranteeing that output explanations are identical if the corresponding input values are identical. By ensuring that multiple explanations are consistent, the explanations can be better compared and understood, which can provide a more accurate understanding of the corresponding black-box model.

In some examples, a computer system can implement the following tuning (e.g., fitting or training) process to configure an explanatory model to provide more-consistent explanations. The computer system can first receive input datasets and identify variable (e.g., features) with values that differ across the input datasets. The computer system can then map each input dataset to an encoded input dataset, where each variable with varying values is one-hot encoded according to its position in the original input dataset, and each fixed (unchanging) variable is unmodified. The computer system can then encode a background dataset n times, so that there is one version of the background dataset per one-hot position. The computer system can generate synthetic data based on the encoded input datasets and background datasets. The computer system can provide the synthetic data as input to a target model (e.g., a black-box model) to receive corresponding outputs. The computer system can then use the synthetic data and the outputs from the target model to configure a corresponding explanatory model. For example, the computer system can run a weighted linear regression over the synthetic data to fit the explanatory model. The weights of the fitted explanatory model can then be mapped into explanations for the corresponding input datasets. Using these techniques, the explanatory model can be tuned to provide consistent explanations across the original input datasets.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a diagram of an example of a process for configuring an explanatory model to output consistent results according to some aspects of the present disclosure. As shown, the process can involve a computer system 100 performing a tuning process for configuring an explanatory model 116. The computer system 100 can include any number and combination of computing devices, such as desktop computers, laptop computers, servers, and/or tablets.

The tuning process may begin with the computer system 100 obtaining background data 102 and input datasets 104a-c. The background data 102 may be pre-generated data (e.g., randomized data) that is different from the input datasets 104a-c to be evaluated. The background data 102 may be obtained from a repository, where it may be stored independently of the input datasets 104a-c. The input datasets 104a-c may be provided by a user, independently of the background data 102.

The input datasets 102a-c can each include a respective set of values for the same set of variables. For example, as shown in FIG. 2, the first input dataset 104a can include the values {ant, box, car, dog, fox} for five variables, the second input dataset 104b can include the values {ant, zip, car, dog, van} for the same five variables, and the third input dataset 104c can include the values {ant, cup, car, dog, and van} for the same five variables. Of course, in other examples there may be more or fewer variables in the input datasets. As shown, the values for Variables 2 and 5 differ among the datasets, while the remaining variable values are the same. In particular, there are three different values for Variable 2 across the three input datasets, and there are two different values for Variable 5 across the three input datasets. The rest of the variable values are the same across the three input datasets.

After receiving the input datasets 104a-c, the computer system 100 can next generate encoded datasets 106a-c based on the input datasets 104a-c. For example, the computer system 100 can generate a first encoded dataset 106a by applying an encoding algorithm to the first input dataset 104a. The computer system 100 can also generate a second encoded dataset 106b by applying the encoding algorithm to the second input dataset 104b, and a third encoded dataset 106c by applying the encoding algorithm to the third input dataset 104c. An example of the encoding algorithm can be a one-hot encoding algorithm, though other encoding algorithms may be used.

FIG. 3 shows an example of the encoded datasets 106a-c. As shown, the first encoded dataset 106a can be an expanded version of the first input dataset 104a that includes multiple fields (e.g., spaces) at the location in the first input dataset 104a that corresponds to Variable 2. In this example, there are three fields that correspond to the three values of Variable 2 across the three input datasets 104a-c. Each field corresponds to one of the values of Variable 2 in one of the input datasets. Since the first input dataset 104a had the value "box" for Variable 2, that value can be flagged as present in the first encoded dataset 106a. The first encoded dataset 106a can be also be expanded to include multiple fields at the location in the first input dataset 104a that corresponds to Variable 5. In this example, there are two fields that correspond to the two values of Variable 5 across the three input datasets 104a-c. Each field corresponds to one of the values of Variable 5 in one of the input datasets. Since the first input dataset 104a has the value "fox" for Variable 5, that value can be flagged as present in the first input dataset 104a. The second encoded dataset 106b and third encoded dataset 106 can also be expanded versions of the original input datasets 104a-b, generated using a similar approach as the first encoded dataset 106a. These arrangements of variable values can be represented in binary format 302, 304, where a 1 indicates the presence of a particular value for a variable and a 0 indicates the absence of the particular value for the variable. For example, [1 0 0] can correspond to the first encoded dataset 106a and indicate the presence of "fox" in the first input dataset 104a for Variable 2, as well as the absence of "zip" and "cup" from the first input dataset 104a for Variable 2. As another example, [0 1 0] can correspond to the second encoded dataset 106b and indicate the presence of "zip" in the second input dataset 104b for Variable 2, as well as the absence of "fox" and "cup" from the second input dataset 104b for Variable 2.

Continuing with FIG. 1, the computer system 100 can also generate encoded background data 110 based on the background data 102. In some examples, the computer system 100 can generate the encoded background data 110 based on how many different values of a particular variable are present in the input datasets 104a-c. For example, if there are three values for Variable 2 across the three input datasets 104a-c, the computer system 100 can generate three encoded versions of the background data 102, so that there is one encoded version of the background data 102 per one-hot position. For instance, the computer system 100 can generate a first version of the encoded background data based on a first one-hot position associated with a first value for Variable 2 in the first input dataset 104a. The computer system 100 can also generate a second version of the encoded background data based on a second one-hot position associated with a second value for Variable 2 in the second input dataset 104b. The computer system 100 can further generate a third version of the encoded background data based on a third one-hot position associated with a third value for Variable 3 in the third input dataset 104c. These three versions can individually or collectively be referred to as the "encoded background data 110."

Figure 4:
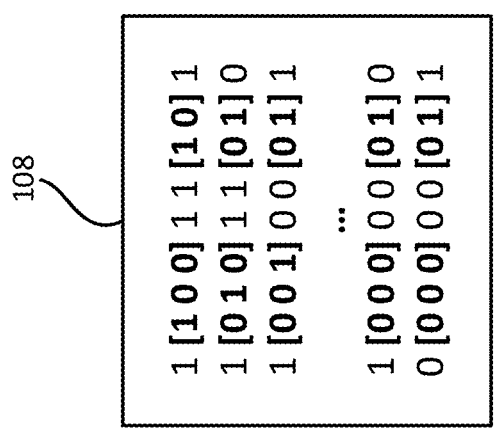
FIG. 4 shows an example of synthetic data according to aspects of the present disclosure.

The computer system 100 can next generate synthetic data 108 containing any number of synthetic data samples based on the encoded background data 110 and the encoded input datasets 104a-c. The synthetic data samples can include various permutations of the encoded background data 110 and the encoded input datasets 104a-c. For example, the synthetic data samples can include substantially all possible permutations of the encoded background data 110 and the encoded input datasets 104a-c. One example of the synthetic data 108 is shown in FIG. 4. In this example, the one-hot encoded vectors for Variables 2 and 5 are depicted in bold.

After generating the synthetic data 108, the computer system 100 can provide the synthetic data 108 as input to a target model 112. Examples of the target model can include a neural network, decision tree, clusterer, classifier, factorizer, or an ensemble of models. The target model 112 may have previously been trained on training data 120. The training data 120 can be different from the synthetic data 108, input datasets 104a-c, and/or the background data 102.

Based on the synthetic data 108, the target model 112 can generate corresponding outputs 114. In this example, the outputs are represented as $y_0$-$y_n$. Those outputs correspond to synthetic data samples $x'_0$-$x'_n$. The target model 112 can generate a single output ($y_i$) for each synthetic data sample ($x'i$).

The computer system 100 can use the outputs 114 from the target model 112 to tune the explanatory model 116, which may be for example a Shapley Additive explanations (SHAP) model or a LIME model. If the explanatory model 116 is a linear regression model, the computer system 100 can use the outputs 114 to fit the weighted linear regression such that $g(x', \phi)=y$. Once tuned, the explanatory model 116 can generate explanatory information 118 that may include a first set of numerical values, which are represented as $\phi_0$-$\phi_5$ in FIG. 1. If the explanatory model 116 is a saliency model, the explanatory information 118 can be any number of saliency values. Each saliency value can indicate a degree of influence that a corresponding input variable had on an output (e.g., result) from the target model 112. For example, if the set of saliency values is {0.12, 0.23, 0.05, 0.80, 0.33}, and each element in that list corresponds to an input variable, then the fourth input variable may have the highest degree of influence on the output from the target model 112, because the fourth input variable has the highest saliency value. Conversely, the first input variable may have the lowest degree of influence on the output from the target model 112, because the first input variable has the lowest saliency value.

Figure 5:
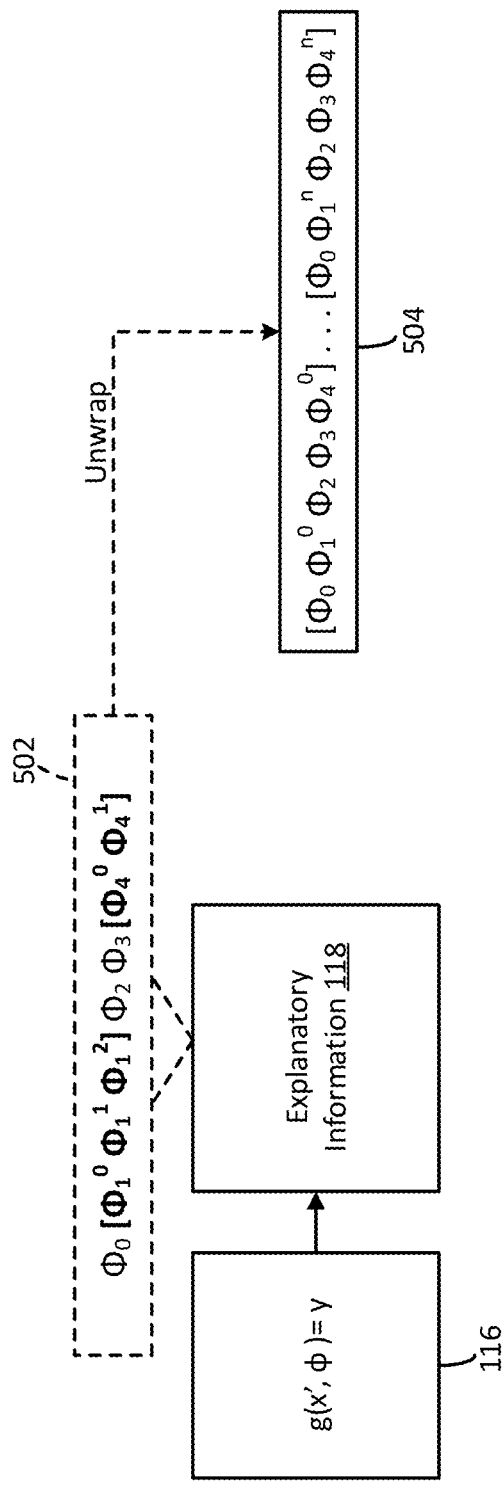
FIG. 5 shows an example of a process for unwrapping a set of output values from an explanatory model according to aspects of the present disclosure.

The explanatory information 118 output by the explanatory model 116 can include one or more output values corresponding to each variable. For example, referring now to FIG. 5, the explanatory information 118 can include the following output values 502: $\{\phi_0 \ [\phi_1^0 \ \phi_1^1 \ \phi_1^2] \ \phi_2 \ \phi_3 \ [\phi_4^0 \ \phi_4^1]\}$, where $\phi_i$ is an output value corresponding to variable i. There can be three output values ($\phi_1^{0-2}$) for Variable 2 due to the three different input values for Variable 2. Likewise, there can be two output values ($\phi_4^{0-1}$) for Variable 5 due to the two different input values for Variable 5. The output values 502 can then be unwrapped so that it is converted into an expanded output 504: $\{[\phi_0 \ \phi_1^0 \ \phi_2 \ \phi_3 \ \phi_4^0] \ldots [\phi_0 \ \phi_1'' \ \phi_2 \ \phi_3 \ \phi_4'']\}$. In this way, the original output values 502 can be mapped to the expanded output 504. Through this process, the explanatory information 118 provided by the explanatory model 116 can remain consistent, despite the varying inputs for Variables 2 and 5. For example, the output values for $\phi_0$, $\phi_2$, and $\phi_3$ will remain the same in relation to all of the input datasets 104a-c, thereby resulting in consistency among those output values, even though $\phi_1$ and $\phi_5$ may change based on the differences in the input datasets 104a-c.

Figure 6:
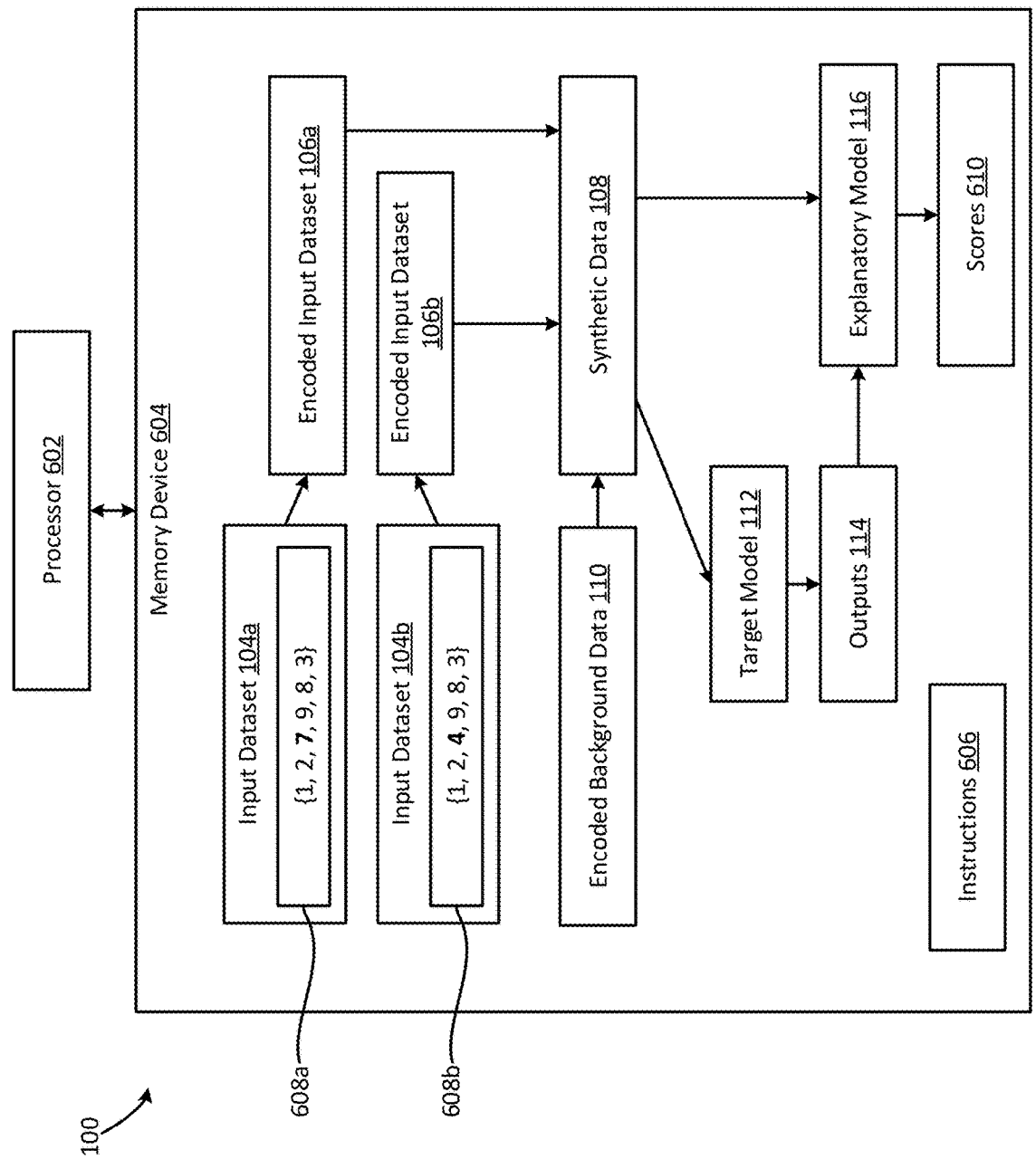
FIG. 6 shows an example of a computer system for implementing some aspects of the present disclosure.

FIG. 6 shows an example of the computer system 100 for implementing some aspects of the present disclosure. The computer system 100 includes a processor 602 communicatively coupled to a memory 604. The processor 602 is hardware that can include one processor or multiple processors. Examples of the processor 602 can include a Field-Programmable Gate Array (FPGA), an application-specific integrated circuit (ASIC), or a microprocessor. The processor 602 can execute instructions 606 stored in the memory 604 to perform operations. The instructions 606 may include processor-specific instructions generated by a compiler or an interpreter from code written in any suitable computer-programming language, such as C, C++, C #, Java, or Python.

The memory 604 is hardware that can include one memory device or multiple memory devices. The memory 604 can be volatile or non-volatile (it can retain stored information when powered off). Examples of the memory 604 include electrically erasable and programmable read-only memory (EEPROM), flash memory, or cache memory. At least some of the memory 604 includes a non-transitory computer-readable medium from which the processor 602 can read instructions 606. A computer-readable medium can include electronic, optical, magnetic, or other storage devices capable of providing the processor 602 with the instructions 606 or other program code. Examples of a computer-readable mediums include magnetic disks, memory chips, ROM, random-access memory (RAM), an ASIC, a configured processor, and optical storage.

In some examples, the processor 602 can execute the instructions 606 to perform operations. For example, the processor 602 can receive input datasets 104a-b that each include a respective set of variable values 608a-b for the same set of variables. The input datasets 104a-b can have different values for a particular variable in the set of variables. In the example shown in FIG. 6, the input datasets 104a-b have different values (7 vs. 4) for the third variable.

Next, the processor 602 can generate encoded input datasets 106a-b by performing one-hot encoding with respect to the different values of the particular variable. The processor 602 can also generate encoded background data 110, for example based on how many different values of the particular variable are present in the input datasets 104a-b. Because there are two variations of the third variable in this example, the processor 602 may generate three different versions of the encoded background data.

After generating the encoded input datasets 106a-b, the processor 602 generate synthetic data 108 based on the encoded input datasets 106a-b. The processor 602 may also generate the synthetic data 108 based on the encoded background data 110. The synthetic data 108 can include multiple permutations of the encoded input datasets 104a-b and/or the encoded background data 110.

The processor 602 can next provide the synthetic data 108 as input to a target model 112 to receive outputs 114 from the target model 112. The target model 112 can generate the outputs 114 based on the inputs. The processor 602 can then configure an explanatory model 116 based on the synthetic data 108 and/or the outputs 114 from the target model 112. For example, the processor 602 can fit the explanatory model 116 based on the synthetic data 108 and the outputs 114. The explanatory model 116 can be configured to generate scores 610. The scores 610 can indicate how a selected set of values for the set of variables influences an output from the target model 112. For example, the scores 610 can be saliency values that are numerical weights indicating a level of influence that each variable value has on an output associated with the target model 112.

Figure 7:
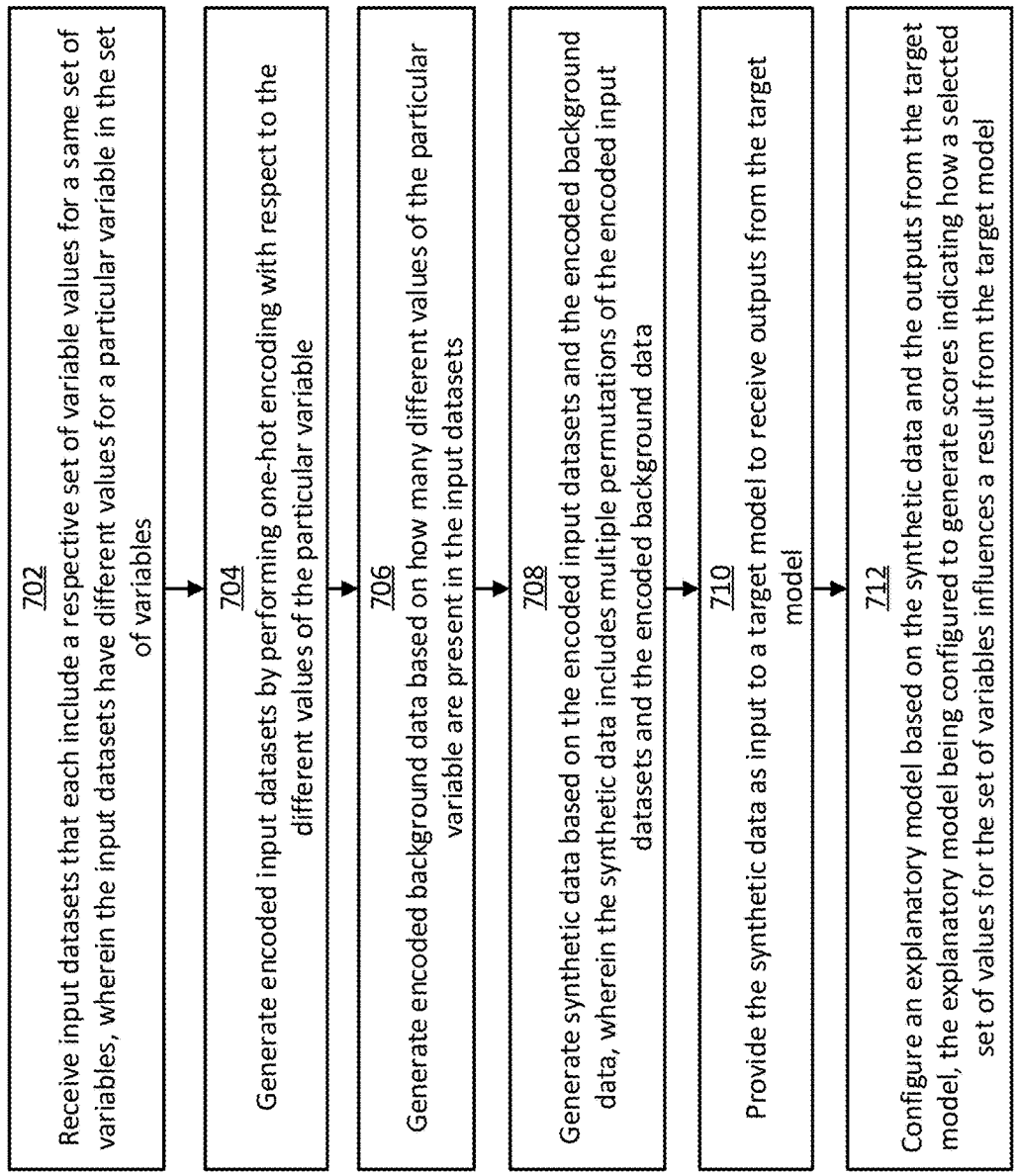
FIG. 7 is a flowchart of an example of a process for configuring an explanatory model to output consistent results according to some aspects of the present disclosure.

FIG. 7 is a flowchart of an example of a process for configuring an explanatory model to output consistent results according to some aspects of the present disclosure. Other examples may involve more operations, fewer operations, different operations, or a different order of operations than is shown in FIG. 7. The operations of FIG. 7 are described below with reference to the components of FIG. 6.

In block 702, the processor 602 receives input datasets 104a-b that each include a respective set of variable values 608a-b for the same set of variables. The input datasets 104a-b can have different values for a particular variable in the set of variables. For example, the input datasets 104a may have a value of "red" for a color variable, whereas the input dataset 104b may have a value of "green" for the color variable.

In block 704, the processor 602 generates encoded input datasets 106a-b by performing one-hot encoding with respect to the different values of the particular variable. One-hot encoding can help convert categorical data in the input datasets 104a-b into numerical data that can be more easily consumed by a target model 112. The categorical data may be, for example, the "red" and "green" values for the color variable described above.

In block 706, the processor 602 generates encoded background data 110. The processor 602 may or may not generate the encoded background data 110 based on how many different values of the particular variable are present in the input datasets 104a-b. For example, if there are n variations of a variable, the processor 602 may generate n different versions of the encoded background data.

In block 708, the processor 602 generates synthetic data 108 based on the encoded input datasets 106a-b. The processor 602 may also generate the synthetic data 108 based on the encoded background data 110. The synthetic data 108 can include hundreds or thousands of permutations of the encoded input datasets 104a-b and the encoded background data 110.

In block 710, the processor 602 provides the synthetic data 108 as input to a target model 112 to receive outputs 114 from the target model 112. The target model 112 can generate the outputs 114 based on the inputs.

In block 712, the processor 602 configures an explanatory model 116 based on the synthetic data 108 and/or the outputs 114 from the target model 112. For example, the processor 602 can fit or train the explanatory model 116 based on the synthetic data 108 and the outputs 114. The explanatory model 116 can be configured to generate scores 610 indicating how a selected set of values for the set of variables influences an output from the target model 112. For example, the scores 610 can be numerical weights indicating a level of influence that each variable value has on an output of the target model 112.

In some aspects, an explanatory model can be configured to output consistent explanations across inputs according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by one or more processors for causing the one or more processors to: receive input datasets that each include a respective set of variable values for a same set of variables, wherein the input datasets have different values for a particular variable in the set of variables; generate encoded input datasets by performing one-hot encoding with respect to the different values of the particular variable; generate encoded background data based on how many different values of the particular variable are present in the input datasets; generate synthetic data based on the encoded input datasets and the encoded background data, wherein the synthetic data includes multiple permutations of the encoded input datasets and the encoded background data; provide the synthetic data as input to a target model to receive outputs from the target model; and configure an explanatory model based on the synthetic data and the outputs from the target model, the explanatory model being configured to generate scores indicating how a selected set of values for the set of variables influences an output from the target model.

Example #2: The non-transitory computer-readable medium of Example #1, wherein each of the scores indicates how a respective value in the selected set of values influenced the output from the target model.

Example #3: The non-transitory computer-readable medium of any of Examples #1-2, wherein the explanatory model is a Shapley additive explanations (SHAP) model.

Example #4: The non-transitory computer-readable medium of any of Examples #1-3, wherein the explanatory model is separate from the target model.

Example #5: The non-transitory computer-readable medium of any of Examples #1-4, wherein the target model is a machine-learning model trained on training data that is different from the synthetic data.

Example #6: The non-transitory computer-readable medium of any of Examples #1-5, further comprising program code that is executable by the one or more processors for causing the one or more processors to configure the explanatory model based on the synthetic data by: fitting the explanatory model to the synthetic data.

Example #7: The non-transitory computer-readable medium of any of Examples #1-6, wherein the input datasets includes a first input dataset and a second input dataset, and further comprising program code that is executable by the one or more processors for causing the one or more processors to generate the encoded input datasets by: determining a first value of the particular variable in the first input dataset; determining a second value of the particular variable in the second input dataset, the second value being different from the first value; generating a first encoded dataset that includes a one-hot encoded representation of the first value; and generating a second encoded dataset that includes a one-hot encoded representation of the second value, wherein the first encoded dataset and the second encoded dataset are included in the encoded input datasets.

Example #8: A method comprising: receiving, by one or more processors, input datasets that each include a respective set of variable values for a same set of variables, wherein the input datasets have different values for a particular variable in the set of variables; generating, by the one or more processors, encoded input datasets by performing one-hot encoding with respect to the different values of the particular variable; generating, by the one or more processors, encoded background data based on how many different values of the particular variable are present in the input datasets; generating, by the one or more processors, synthetic data based on the encoded input datasets and the encoded background data, wherein the synthetic data includes multiple permutations of the encoded input datasets and the encoded background data; providing, by the one or more processors, the synthetic data as input to a target model to receive outputs from the target model; and configuring, by the one or more processors, an explanatory model based on the synthetic data and the outputs from the target model, the explanatory model being configured to generate scores indicating how a selected set of values for the set of variables influences an output from the target model.

Example #9: The method of claim 8, wherein each of the scores indicates how a respective value in the selected set of values influenced the output from the target model.

Example #10: The method of any of Examples #8-9, wherein the explanatory model is a Shapley additive explanations (SHAP) model.

Example #11: The method of any of Examples #8-10, wherein the explanatory model is separate from the target model.

Example #12: The method of any of Examples #8-11, wherein the target model is a machine-learning model trained on training data that is different from the synthetic data.

Example #13: The method of any of Examples #8-12, further comprising configuring the explanatory model based on the synthetic data by: fitting the explanatory model to the synthetic data.

Example #14: The method of any of Examples #8-13, wherein the input datasets includes a first input dataset and a second input dataset, and further comprising generating the encoded input datasets by: determining a first value of the particular variable in the first input dataset; determining a second value of the particular variable in the second input dataset, the second value being different from the first value; generating a first encoded dataset that includes a one-hot encoded representation of the first value; and generating a second encoded dataset that includes a one-hot encoded representation of the second value, wherein the first encoded dataset and the second encoded dataset are included in the encoded input datasets.

Example #15: A system comprising: one or more processors; and one or more memories includes instructions that are executable by the one or more processors for causing the one or more processors to: receive input datasets that each include a respective set of variable values for a same set of variables, wherein the input datasets have different values for a particular variable in the set of variables; generate encoded input datasets by performing one-hot encoding with respect to the different values of the particular variable; generate encoded background data based on how many different values of the particular variable are present in the input datasets; generate synthetic data based on the encoded input datasets and the encoded background data, wherein the synthetic data includes multiple permutations of the encoded input datasets and the encoded background data; provide the synthetic data as input to a target model to receive outputs from the target model; and configure an explanatory model based on the synthetic data and the outputs from the target model, the explanatory model being configured to generate scores indicating how a selected set of values for the set of variables influences an output from the target model.

Example #16: The system of Example #15, wherein each of the scores indicates how a respective value in the selected set of values influenced the output from the target model.

Example #17: The system of any of Examples #15-16, wherein the explanatory model is a Shapley additive explanations (SHAP) model that is separate from the target model.

Example #18: The system of any of Examples #15-17, wherein the target model is a machine-learning model trained on training data that is different from the synthetic data.

Example #19: The system of any of Examples #15-18, wherein the one or more memories further include instructions that are executable by the one or more processors for causing the one or more processors to configure the explanatory model based on the synthetic data by: fitting the explanatory model to the synthetic data.

Example #20: The system of any of Examples #15-19, wherein the input datasets includes a first input dataset and a second input dataset, and wherein the one or more memories further include instructions that are executable by the one or more processors for causing the one or more processors to generate the encoded input datasets by: determining a first value of the particular variable in the first input dataset; determining a second value of the particular variable in the second input dataset, the second value being different from the first value; generating a first encoded dataset that includes a one-hot encoded representation of the first value; and generating a second encoded dataset that includes a one-hot encoded representation of the second value, wherein the first encoded dataset and the second encoded dataset are included in the encoded input datasets.

Example #21: A non-transitory computer-readable medium comprising program code that is executable by one or more processors for causing the one or more processors to: receive a first set of values for a set of variables and a second set of values for the set of variables, the first set of values including a first value for a variable that is different from a second value for the variable in the second set of values; generate encoded input datasets by applying an encoding technique to the first value and the second value of the variable; generate synthetic data based on the encoded input datasets, wherein the synthetic data includes multiple permutations of the encoded input datasets; provide the synthetic data as input to a target model to receive outputs from the target model; and configure an explanatory model based on the synthetic data and the outputs from the target model, the explanatory model being configured to indicate how providing a selected value for the variable as input to a target model influences an output from the target model.

Example #22: The non-transitory computer-readable medium of Example #21, wherein the encoding technique is a one-hot encoding technique.

Example #23: The non-transitory computer-readable medium of any of Examples #21-22, wherein the explanatory model is configured to generate scores indicating how a selected set of values for the set of variables influences the output from the target model, and wherein each of the scores indicates how a respective value in the selected set of values influenced the output.

Example #24: The non-transitory computer-readable medium of any of Examples #21-23, wherein the explanatory model is a Shapley additive explanations (SHAP) model.

Example #25: The non-transitory computer-readable medium of any of Examples #21-24, wherein the explanatory model is separate from the target model.

Example #26: The non-transitory computer-readable medium of any of Examples #21-25, wherein the target model is a machine-learning model trained on training data that is different from the synthetic data.

Example #27: The non-transitory computer-readable medium of any of Examples #21-26, further comprising program code that is executable by the one or more processors for causing the one or more processors to configure the explanatory model based on the synthetic data by: fitting the explanatory model to the synthetic data.

Example #28: The non-transitory computer-readable medium of any of Examples #21-27, further comprising program code that is executable by the one or more processors for causing the one or more processors to generate the encoded input datasets by: generating a first encoded dataset that includes a one-hot encoded representation of the first value; and generating a second encoded dataset that includes a one-hot encoded representation of the second value, wherein the first encoded dataset and the second encoded dataset are included in the encoded input datasets.

Example #29: A method comprising: receiving, by one or more processors, a first set of values for a set of variables and a second set of values for the set of variables, the first set of values including a first value for a variable that is different from a second value for the variable in the second set of values; generating, by the one or more processors, encoded input datasets by applying an encoding technique to the first value and the second value of the variable; generating, by the one or more processors, synthetic data based on the encoded input datasets, wherein the synthetic data includes multiple permutations of the encoded input datasets; providing, by the one or more processors, the synthetic data as input to a target model to receive outputs from the target model; and configuring, by the one or more processors, an explanatory model based on the synthetic data and the outputs from the target model, the explanatory model being configured to indicate how providing a selected value for the variable as input to a target model influences an output from the target model.

Example #30: The method of Example #29, wherein the encoding technique is a one-hot encoding technique.

Example #31: The method of any of Examples #29-30, wherein the explanatory model is configured to generate scores indicating how a selected set of values for the set of variables influences the output from the target model, and wherein each of the scores indicates how a respective value in the selected set of values influenced the output.

Example #32: The method of any of Examples #29-31, wherein the explanatory model is a Shapley additive explanations (SHAP) model.

Example #33: The method of any of Examples #29-32, wherein the explanatory model is separate from the target model.

Example #34: The method of any of Examples #29-33, wherein the target model is a machine-learning model trained on training data that is different from the synthetic data.

Example #35: The method of any of Examples #29-34, further comprising configuring the explanatory model based on the synthetic data by fitting the explanatory model to the synthetic data.

Example #36: The method of any of Examples #29-35, further comprising generating the encoded input datasets by: generating a first encoded dataset that includes a one-hot encoded representation of the first value; and generating a second encoded dataset that includes a one-hot encoded representation of the second value, wherein the first encoded dataset and the second encoded dataset are included in the encoded input datasets.

Example #37: A system comprising: one or more processors; and one or more memories includes instructions that are executable by the one or more processors for causing the one or more processors to: receive a first set of values for a set of variables and a second set of values for the set of variables, the first set of values including a first value for a variable that is different from a second value for the variable in the second set of values; generate encoded input datasets by applying an encoding technique to the first value and the second value of the variable; generate synthetic data based on the encoded input datasets, wherein the synthetic data includes multiple permutations of the encoded input datasets; provide the synthetic data as input to a target model to receive outputs from the target model; and configure an explanatory model based on the synthetic data and the outputs from the target model, the explanatory model being configured to indicate how providing a selected value for the variable as input to a target model influences an output from the target model.

Example #38: A system comprising: means for receiving input datasets that each include a respective set of variable values for a same set of variables, wherein the input datasets have different values for a particular variable in the set of variables; means for generating encoded input datasets by performing one-hot encoding with respect to the different values of the particular variable; means for generating encoded background data based on how many different values of the particular variable are present in the input datasets; means for generating synthetic data based on the encoded input datasets and the encoded background data, wherein the synthetic data includes multiple permutations of the encoded input datasets and the encoded background data; means for providing the synthetic data as input to a target model to receive outputs from the target model; and means for configuring an explanatory model based on the synthetic data and the outputs from the target model, the explanatory model being configured to generate scores indicating how a selected set of values for the set of variables influences an output from the target model.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A non-transitory computer-readable medium comprising program code that is executable by one or more processors for causing the one or more processors to:

receive input datasets that each include a respective set of variable values for a same set of variables, wherein the input datasets have different values for a particular variable in the set of variables, and wherein the input datasets include a first input dataset and a second input dataset;

generate encoded input datasets by performing one-hot encoding with respect to the different values of the particular variable, wherein generating the encoded input datasets involves:
  determining a first value of the particular variable in the first input dataset;
  determining a second value of the particular variable in the second input dataset, the second value being different from the first value;
  generating a first encoded dataset that includes a one-hot encoded representation of the first value; and
  generating a second encoded dataset that includes a one-hot encoded representation of the second value, wherein the first encoded dataset and the second encoded dataset are included in the encoded input datasets;

generate encoded background data based on how many different values of the particular variable are present in the input datasets;

generate synthetic data based on the encoded input datasets and the encoded background data, wherein the synthetic data includes multiple permutations of the encoded input datasets and the encoded background data;

provide the synthetic data as input to a target model to receive outputs from the target model; and configure an explanatory model based on the synthetic data and the outputs from the target model, the explanatory model being configured to generate scores indicating how a selected set of values for the set of variables influences an output from the target model.

2. The non-transitory computer-readable medium of claim 1, wherein each of the scores indicates how a respective value in the selected set of values influenced the output from the target model.

3. The non-transitory computer-readable medium of claim 1, wherein the explanatory model is a Shapley additive explanations (SHAP) model.

4. The non-transitory computer-readable medium of claim 1, wherein the explanatory model is separate from the target model.

5. The non-transitory computer-readable medium of claim 1, wherein the target model is a machine-learning model trained on training data that is different from the synthetic data.

6. The non-transitory computer-readable medium of claim 1, further comprising program code that is executable by the one or more processors for causing the one or more processors to configure the explanatory model based on the synthetic data by:
fitting the explanatory model to the synthetic data.

7. A method comprising:
receiving, by one or more processors, input datasets that each include a respective set of variable values for a same set of variables, wherein the input datasets have different values for a particular variable in the set of variables, and wherein the input datasets include a first input dataset and a second input dataset;
generating, by the one or more processors, encoded input datasets by performing one-hot encoding with respect to the different values of the particular variable, wherein generating the encoded input datasets involves:
determining a first value of the particular variable in the first input dataset;
determining a second value of the particular variable in the second input dataset, the second value being different from the first value;
generating a first encoded dataset that includes a one-hot encoded representation of the first value; and
generating a second encoded dataset that includes a one-hot encoded representation of the second value, wherein the first encoded dataset and the second encoded dataset are included in the encoded input datasets;
generating, by the one or more processors, encoded background data based on how many different values of the particular variable are present in the input datasets;
generating, by the one or more processors, synthetic data based on the encoded input datasets and the encoded background data, wherein the synthetic data includes multiple permutations of the encoded input datasets and the encoded background data; providing, by the one or more processors, the synthetic data as input to a target model to receive outputs from the target model; and
configuring, by the one or more processors, an explanatory model based on the synthetic data and the outputs from the target model, the explanatory model being configured to generate scores indicating how a selected set of values for the set of variables influences an output from the target model.

8. The method of claim 7, wherein each of the scores indicates how a respective value in the selected set of values influenced the output from the target model.

9. The method of claim 7, wherein the explanatory model is a Shapley additive explanations (SHAP) model.

10. The method of claim 7, wherein the explanatory model is separate from the target model.

11. The method of claim 7, wherein the target model is a machine-learning model trained on training data that is different from the synthetic data.

12. The method of claim 7, further comprising configuring the explanatory model based on the synthetic data by:
fitting the explanatory model to the synthetic data.

13. A system comprising:
one or more processors; and
one or more memories includes instructions that are executable by the one or more processors for causing the one or more processors to:
receive input datasets that each include a respective set of variable values for a same set of variables, wherein the input datasets have different values for a particular variable in the set of variables, and wherein the input datasets include a first input dataset and a second input dataset;
generate encoded input datasets by performing one-hot encoding with respect to the different values of the particular variable, wherein generating the encoded input datasets involves:
determining a first value of the particular variable in the first input dataset;
determining a second value of the particular variable in the second input dataset, the second value being different from the first value;
generating a first encoded dataset that includes a one-hot encoded representation of the first value; and
generating a second encoded dataset that includes a one-hot encoded representation of the second value, wherein the first encoded dataset and the second encoded dataset are included in the encoded input datasets;
generate encoded background data based on how many different values of the particular variable are present in the input datasets;
generate synthetic data based on the encoded input datasets and the encoded background data, wherein the synthetic data includes multiple permutations of the encoded input datasets and the encoded background data;
provide the synthetic data as input to a target model to receive outputs from the target model; and
configure an explanatory model based on the synthetic data and the outputs from the target model, the explanatory model being configured to generate scores indicating how a selected set of values for the set of variables influences an output from the target model.

14. The system of claim 13, wherein each of the scores indicates how a respective value in the selected set of values influenced the output from the target model.

15. The system of claim 13, wherein the explanatory model is a Shapley additive explanations (SHAP) model that is separate from the target model.

16. The system of claim 13, wherein the target model is a machine-learning model trained on training data that is different from the synthetic data.

17. The system of claim 13, wherein the one or more memories further include instructions that are executable by the one or more processors for causing the one or more processors to configure the explanatory model based on the synthetic data by: fitting the explanatory model to the synthetic data.

* * * * *